(12) United States Patent
Masuo

(10) Patent No.: US 8,589,768 B2
(45) Date of Patent: Nov. 19, 2013

(54) MEMORY SYSTEM HAVING MULTIPLE CHANNELS AND WRITE CONTROL METHOD INCLUDING DETERMINATION OF ERROR CORRECTION CHANNEL IN MEMORY SYSTEM

(75) Inventor: Yoko Masuo, Iruma (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 68 days.

(21) Appl. No.: 13/421,538

(22) Filed: Mar. 15, 2012

(65) Prior Publication Data

US 2012/0311394 A1 Dec. 6, 2012

(30) Foreign Application Priority Data

May 30, 2011 (JP) ................. 2011-120934

(51) Int. Cl.
*G11C 29/00* (2006.01)
*G06F 13/00* (2006.01)
*G06F 13/28* (2006.01)

(52) U.S. Cl.
USPC ............ 714/766; 714/805; 711/150; 711/168

(58) Field of Classification Search
USPC ........ 714/766, 763, 764, 799, 800, 805, 6.25, 714/48, 52, 54; 711/100, 150, 167, 168
See application file for complete search history.

(56) References Cited

U.S. PATENT DOCUMENTS

| 4,201,976 A | 5/1980 | Patel |
| 4,205,324 A | 5/1980 | Patel |
| 7,539,842 B2 * | 5/2009 | Tremaine ............ 711/207 |
| 7,552,378 B2 | 6/2009 | Kawagoe et al. |
| 8,239,713 B2 * | 8/2012 | Borchers et al. ........ 714/723 |
| 8,433,980 B2 * | 4/2013 | Alrod et al. ............ 714/773 |

FOREIGN PATENT DOCUMENTS

| JP | S63-043833 | 9/1988 |
| JP | 01-292541 | 11/1989 |
| JP | 2006-014156 | 1/2006 |

* cited by examiner

*Primary Examiner* — Christine Tu
(74) *Attorney, Agent, or Firm* — Knobbe, Martens, Olson & Bear, LLP

(57) ABSTRACT

According to one embodiment, an error correction channel determination module determines, a channel to be allocated to a logical page as an error correction channel so that each of a plurality of channels is allocated to a uniform number of logical pages as the error correction channel. A command list generation module generates a list of write commands each specifying that a corresponding logical page is to be written using, in parallel, channels included in the plurality of channels and excluding the error correction channel, based on the determination of the channel to be allocated to the corresponding logical page as the error correction channel. A command list issue module issues the list of the write commands.

10 Claims, 4 Drawing Sheets

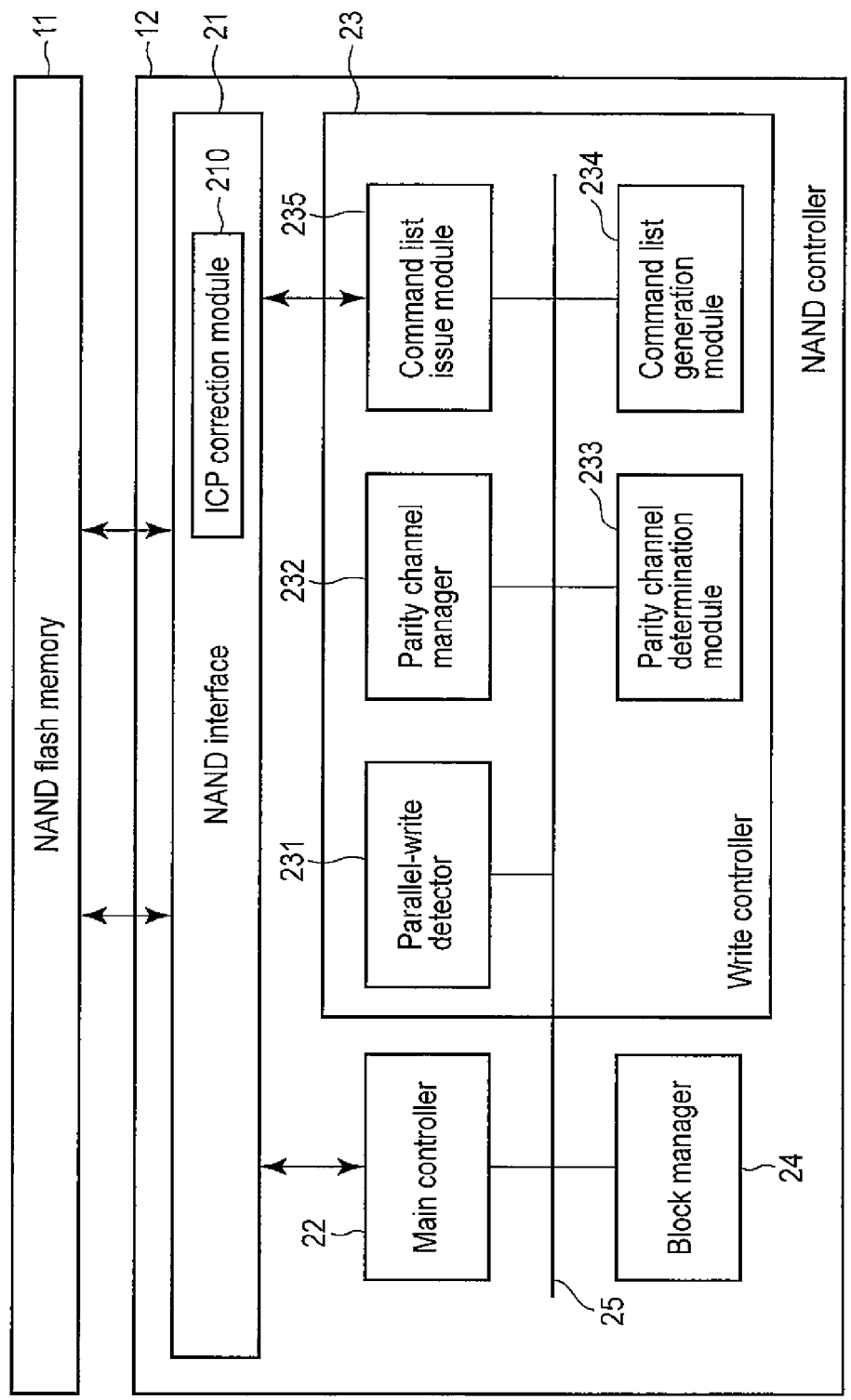
F I G. 1

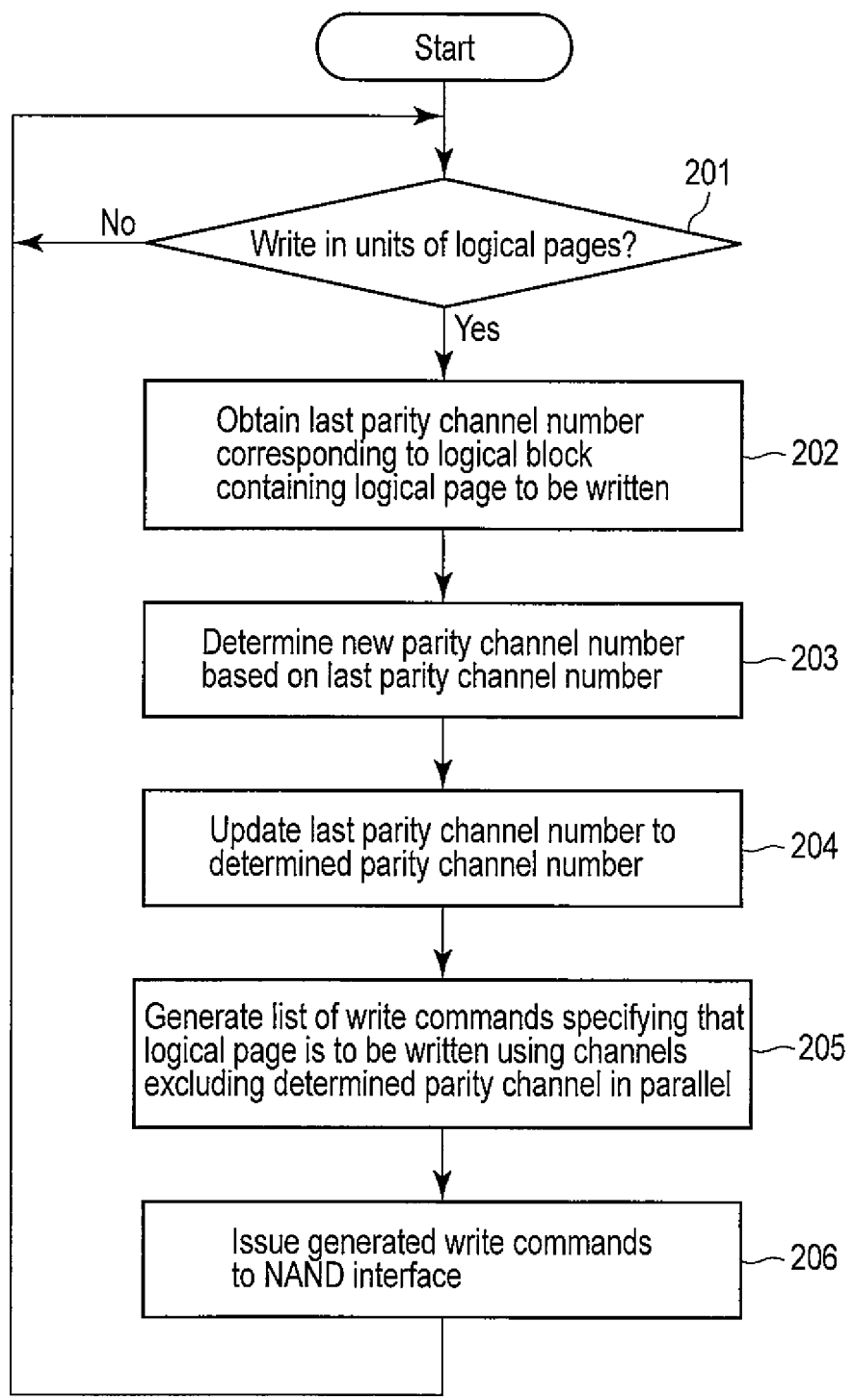
F I G. 2

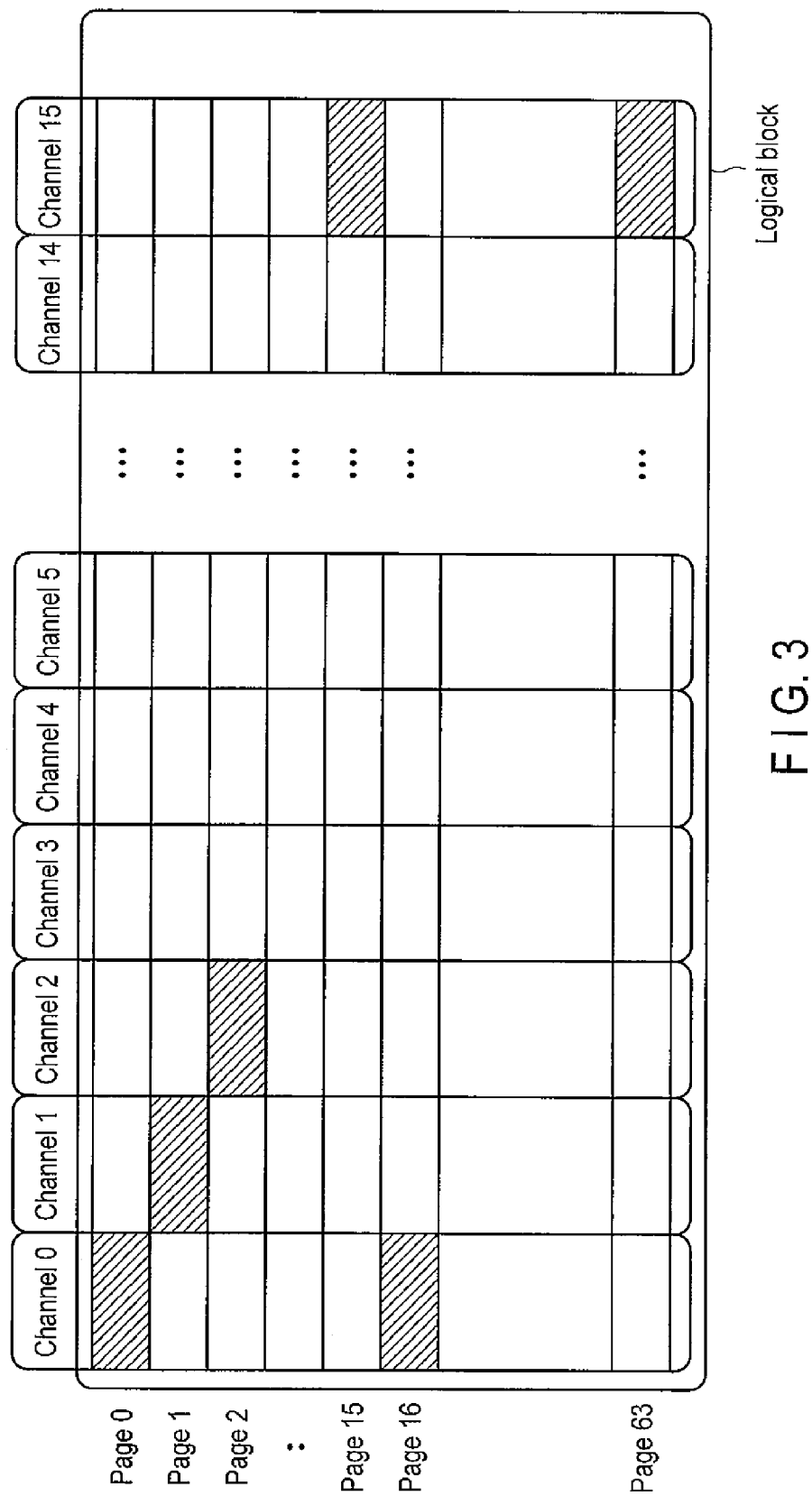
F I G. 3

US 8,589,768 B2

MEMORY SYSTEM HAVING MULTIPLE CHANNELS AND WRITE CONTROL METHOD INCLUDING DETERMINATION OF ERROR CORRECTION CHANNEL IN MEMORY SYSTEM

CROSS-REFERENCE TO RELATED APPLICATIONS

This application is based upon and claims the benefit of priority from prior Japanese Patent Application No. 2011-120934, filed May 30, 2011, the entire contents of which are incorporated herein by reference.

FIELD

Embodiments described herein relate generally to a memory system having multiple channels and a write control method including determination of an error correction channel in the memory system.

BACKGROUND

As is conventionally known, a plurality of (for example, two) types of error correction are applied to storage devices in order to improve the reliability of the devices. Furthermore, in recent years, a memory system with multiple channels has been known which includes a memory typified by a NAND flash memory and which carries out a plurality of access commands in parallel. In general, for each logical page in a logical block, such a memory system can be accessed via a plurality of channels in parallel.

Thus, it is expected that a plurality of types of error correction are applied to a memory system with multiple channels. For example, it is expected that if an uncorrectable error occurs even by use of an error correction code (ECC), the error location is corrected based on inter-channel data. To enable such correction (hereinafter referred to as inter-channel error correction), any one of a plurality of channels may be allocated for storing error correction data for the inter-channel error correction (this channel is hereinafter referred to as an error correction channel). In this case, application of the error correction channel needs to avoid affecting the parallelism of data reads.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is a block diagram showing an exemplary configuration of a memory system having multiple channels according to an embodiment;

FIG. 2 is a flowchart illustrating an exemplary procedure for write control applied in the embodiment and including determination of a parity channel;

FIG. 3 is a diagram illustrating an example of the relationship between the parity channel and the configuration of a logical block applied in the embodiment.

DETAILED DESCRIPTION

Figure 4:
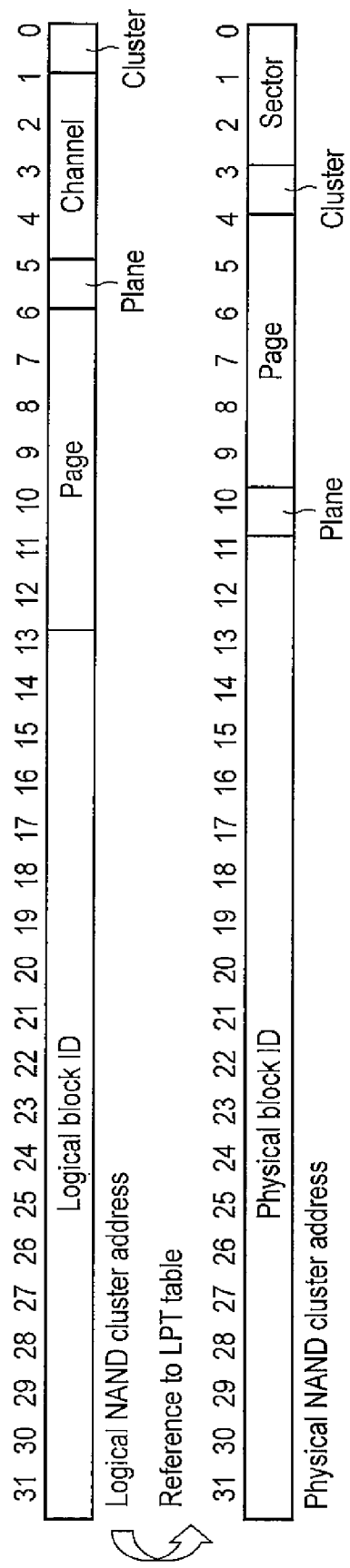
FIG. 4 is a diagram showing an example of formats for a logical address and a physical address which are applied in the embodiment.

Various embodiments will be described hereinafter with reference to the accompanying drawings.

In general, according to one embodiment, a memory system comprises a memory, a memory interface, an inter-channel error correction module, an error correction channel determination module, a command list generation module, and a command list issue module. The memory is configured to be accessed via a plurality of channels. The memory interface is configured to access the memory via the plurality of channels in parallel based on a plurality of access commands. The inter-channel error correction module is configured to correct data in a channel where an error that remains uncorrected after use of an error correction code occurs, based on data in channels which are included in the plurality of channels, and which exclude the channel where the error has occurred but include an error correction channel, if the error occurs in an access carried out by the memory interface. The error correction channel determination module is configured to determine, for each of a plurality of logical pages, a channel to be allocated to the logical page as the error correction channel so that each of the plurality of channels is allocated to a uniform number of logical pages as the error correction channel when the plurality of logical pages comprised in a logical block are sequentially written to the memory via the plurality of channels in units of pages. The command list generation module is configured to generate a list of write commands each specifying that a corresponding logical page is to be written using, in parallel, channels included in the plurality of channels and excluding the error correction channel, based on the determination of the channel to be allocated to the corresponding logical page as the error correction channel. The command list issue module is configured to issue the list of the write commands to the memory interface.

FIG. 1 is a block diagram showing an exemplary configuration of a memory system having multiple channels according to an embodiment. In the embodiment, a memory system 10 shown in FIG. 1 is connected to, for example, a host (not shown in the drawings). The host (host device) utilizes the memory system 10 as a storage device for the host.

The memory system 10 comprises a NAND flash memory 11 and a NAND controller 12. In the embodiment, the memory system 10 is a solid state drive (SSD) utilizing the NAND flash memory 11. The NAND flash memory 11 is a storage medium in which user data is stored. The NAND flash memory 11 comprises a plurality of NAND flash memory chips. The NAND flash memory 11 is configured to be accessed by the NAND controller 12 via a plurality of channels (that is, multiple channels) in parallel, based on a plurality of access commands. The memory system 10 need not be the SSD. Furthermore, instead of the NAND flash memory 11, a memory other than a NAND flash memory may be used provided that the memory can be accessed in units of logical blocks and in units of logical pages via a plurality of channels in parallel.

The NAND controller 12 accesses the NAND flash memory 11 in accordance with requests from the host. The NAND controller 12 also accesses the NAND flash memory 11 for a memory access process in units of blocks, for example, compaction described below.

The NAND controller 12 comprises a NAND interface 21, a main controller 22, a write controller 23, a read controller (not shown in the drawings), and a block manager 24. The main controller 22, the write controller 23 (more specifically, a parallel-write detector 231, a parity channel manger 232, a parity channel determination module 233, a command list generation module 234, and a command list issue module 235 all arranged in the write controller 23), the read controller, and the block manager 24 are interconnected via an internal bus 25.

The NAND interface 21 transmits and receives information between the NAND flash memory 11 and each of the main controller 22, the write controller 23 (particularly the command list issue module 235 in the write controller 23), and the read controller. In the embodiment, the NAND interface 21 is assumed to have 16 channels, 0, 1, . . . , and 15. The channel numbers of the channels 0, 1, . . . , and 15 are 0, 1, . . . , and 15 (decimal expression), respectively. The NAND interface 21 can carry out both data write to and data read data from the NAND flash memory 11, using the 16 channels in parallel. In particular, the data write can be carried out in units of pages.

One logical block is assumed to comprise 64 pages (logical pages), 0, 1, . . . , and 63. Each of the channels 0, 1, . . . and 15 is connected to two planes, 0 and 1. In the embodiment, 32 physical blocks are assigned to one logical block. The 32 physical blocks correspond to planes 0 and 1 of each of the 16 channels 0, 1, . . . , and 15. Each of the physical blocks comprises two clusters per page.

If an error occurs which cannot be corrected even by use of an error correction code (ECC), the NAND interface 21 corrects the error location (the data in the channel containing the error location) based on inter-channel data. This correction is referred to as inter-channel parity correction (ICP correction) or inter-channel error correction.

In the embodiment, to enable each logical page in a logical block to be subjected to the ICP correction, any one of the 16 channels is allocated to the logical page as an error correction channel. Error correction data for the ICP correction is stored in the error correction channel. In writes in units of logical blocks and in units of logical pages, the allocation of the channel is carried out for each logical page. The channel to be allocated as the error correction channel is determined by the parity channel determination module 233 in the write controller 23 based on a predetermined rule.

The error correction data for the ICP correction is generated for each logical page based on the data stored in 15 channels, that is, all channels excluding the error correction channel. The error connection data is, for example, parity data (inter-channel parity data). Thus, the error correction channel in which the inter-channel parity data is stored is hereinafter referred to as a parity channel.

The NAND interface 21 comprises an inter-channel error correction module (hereinafter referred to as an ICP correction module) 210. The ICP correction module 210 carries out the ICP correction using the parity data stored in the parity channel. That is, the ICP correction module 210 corrects the data in a channel containing an error location that remains uncorrected after use of ECC contained in the logical page, based on the parity channel for the logical page.

The main controller 22 controls modules such as the write controller 23 and the block manager 24 which are connected to the internal bus 25. The write controller 23 controls data writes to the NAND flash memory 11 in accordance with requests from the host and further with requests from the main controller 22. In the embodiment, writes to the NAND flash memory are carried out in units of pages. In particular, autonomous data writes in the memory system 10 are performed in units of blocks (logical blocks) and in units of pages (logical pages). Writes in units of pages are performed using the 16 channels in parallel as described above. However, one of the 16 channels is allocated as the parity channel as described above. Inter-channel parity data is written to the parity channel. Such writes in units of blocks and in units of pages also occur in data writes based on user data write requests from the host (that is, in normal user data writes).

Autonomous writes in the memory system 10 are each carried out as a background process with respect to an access process requested by the host. The memory system 10 typified by SSD as in the embodiment involves many background processes involving migration of data between blocks. The background processes correspond to, for example, compaction, patrol refreshing, and wear leveling.

The compaction is a process of collecting valid data from a plurality of fragmented blocks (that is, a plurality of blocks in the fragmented state) and migrating the collected data to another block in order to effectively utilize memory areas in the NAND flash memory 11. The NAND controller 12 comprises a compaction module (not shown in the drawings) configured to carry out compaction.

The patrol refreshing includes a process of periodically reading data from the NAND flash memory 11 in units of data blocks in order to check the data stored in the NAND flash memory for any garbled data (garbled bits) resulting from leaving the data uncontrolled for a long time. The patrol refreshing further includes a process of rewriting logical blocks each containing more than a given number of garbled data. That is, the patrol refreshing is carried out to prevent data from being garbled by relatively unsteady data retention of the NAND flash memory 11. The NAND controller 12 comprises a patrol refresh module (not shown in the drawings) configured to carry out patrol refreshing. The wear leveling is a process of migrating data among blocks so as to level the degrees of fatigue (the numbers of erasures) of all blocks in order to extend the life of the memory system 10.

The write controller 23 comprises the parallel-write detector 231, parity channel manger 232, parity channel determination module 233, command list generation module 234, and command list issue module 235, all described above. The block manager 24 manages, for each logical block, physical blocks assigned to the logical block.

With reference to a flowchart in FIG. 2, an exemplary procedure for write control including determination of the parity channel will be described which control is performed in units of logical blocks and in units of logical pages by the write controller 23. The parallel-write detector 231 detects when the compaction module, the patrol refresh module, or the like has issued a parallel-write command. The parallel-write command specifies that a logical page in a logical block be written using the 16 channels including the parity channel in parallel. That is, the parallel-write detector 231 detects a write in units of logical pages which is involved in a write in units of logical blocks (block 201). Upon detecting the issuance of the parallel-write command (that is, upon detecting the write performed in units of logical pages) has been issued, the parallel-write detector 231 notifies the parity channel determination module 233 of the detection.

The parity channel manager 232 manages, for each logical block, the status of determination (setting) of the parity channel in already executed writes of the logical block in units of pages (that is, the status of past determination of the parity channel). In the embodiment, as the status of past determination of the parity channel for each logical block, a parity channel number is used which is determined when a page (more specifically, the data in a page containing inter-channel parity data) in the logical block is written using the 16 channels in parallel. The parity channel number for each logical block is held in the parity channel manager 232 (more specifically, in an area in a memory such as DRAM which is allocated to the parity channel manger 232) in association with the logical block.

Thus, upon receiving the notification from the parallel-write detector 231, the parity-channel determination module 233 carries out block 202 as follows. That is, the parity channel determination module 233 obtains the last parity channel number (the status of the past parity channel determination) associated with the logical block containing the logical page (that is, the logical page to be written) p specified by the parallel-write command (block 202). The last parity channel number is indicative of the parity channel determined when a write of a logical page p−1 preceding the logical page p is carried out.

Based on the parity channel number obtained and the above-described predetermined rule (parity channel determination method), the parity channel determination module 233 determines a parity channel number to be newly set (block 203). However, if the logical page p is a logical page 0 (p=0), the parity channel number is determined to be a predetermined initial parity channel number, for example, zero.

The determination of the parity channel number by the parity channel determination module 233 will be described with reference to FIG. 3. FIG. 3 is a diagram illustrating an example of the relationship between the parity channel and the configuration of a logical block applied in the embodiment. As shown in FIG. 3, the logical block applied in the embodiment comprises 64 pages (logical pages), that is, pages 0 to 63. Each page comprises 16 channels. In the embodiment, for each page in a logical block, any one of the 16 channels is allocated to the page as the parity channel (the hatched channel in FIG. 3). Here, for each of the channels 0, 1, . . . , and 15, the number of pages which are included in the 64 pages and to which the channel is allocated as the parity channel is four. That is, in the embodiment, the parity channel is allocated to a uniform number of pages included in the 64 pages comprised in one block without a variation in the number of pages among the channels. Various conventionally known methods can be utilized to allocate the parity channel to a uniform number of pages included in the 64 pages comprised in one block. Although not shown in FIG. 3, each page comprises 64 clusters. In the embodiment, four clusters can be simultaneously written to the NAND flash memory 11 via one channel.

Several methods to allocate the parity channel to a uniform number of pages included in the 64 pages comprised in one block will be described below. In a first method, if a write of a logical block is performed in units of pages, then for all the channels, the parity channel is allocated to each of the 64 pages comprised in the logical block in order starting with the leading page (page 0), based on a round robin algorithm, as in the example illustrated in FIG. 3. According to the first method, a channel c (c=0, 1, . . . , and 15) is allocated to a page p−1 (p−1=0, 1, . . . , and 62) as the parity channel, then a channel c' following the channel c (c'=1, 2, . . . , 15, and 0) is allocated to the next page p (p=1, 2, . . . , and 63) as the parity channel. Here, if the channel number of the channel c is 0, 1, . . . , or 14, the channel number of the next channel c' is 1, 2, . . . , or 15. Furthermore, if the channel number of the channel c is 15 (F in a hexadecimal expression), the channel number of the next channel c' is 0. The embodiment uses the first method.

A second method shifts the parity channel at intervals of two or four consecutive pages. A third method randomly allocates the parity channel to each of the 64 pages. Here, the parity channel may be randomly allocated based on the status of past determination (setting) of the parity channel in the corresponding logical block. Then, in spite of the random allocation, for each of the channels 0, 1, . . . , and 15, the number of those of the 64 pages to which the parity channel is allocated can be set to four.

The parity channel manager 232 is notified of the parity channel number determined by the parity channel determination module 233. The parity channel manager 232 updates the parity channel number currently held in association with the logical block specified in the parallel-write command, to the parity channel number of which the parity channel manager 232 has been notified (block 204).

Thus, in the embodiment, the parity channel number determined by the parity channel determination module 233 is held and managed for each logical block by the parity channel manager 232. This serves to exert the following effects.

It is assumed that the memory system 10 is autonomously carrying out a write of a first logical block. That is, it is assumed that the write of the first logical block is being performed in a background process. It is further assumed that during a write of a page p in the first logical block, the host requests the NAND controller 12 of the memory system 10 to carry out a write of a second logical block (user data write):

Then, even if the write of the first logical block is not completed, the NAND controller 12 switches to the write of the second logical block once the write of the page p is completed. Upon completing the write of the second logical block, the NAND controller 12 resumes the write of the first logical block with a page p+1. At this time, the parity channel manager 232 is in the state of holding the parity channel number associated with the first logical block, as the status of past determination of the parity channel corresponding to the first logical block. The parity channel number associated with the first logical block has been determined during the write of the page p immediately before the interruption of write of the first logical block. The parity manager 232 manages the parity channel for each logical block as described above. Thus, when the write of the page p+1 in the first logical block is resumed, the parity channel determination manager 233 can determine the parity channel for the page p+1 based on the parity channel number of the parity channel for the preceding page p.

The block manager 24 is also notified of the parity channel number determined by the parity channel determination module 233. The block manager 24 manages, for each logical block, physical blocks (32 physical blocks) assigned to the logical block, based on a block management table (not shown in the drawings). The block management table is held in the block manager 24 (more specifically, an area in a memory such as DRAM which is assigned to the block manager 24). In the embodiment, the block manager 24 manages the information representing whether each of the channels for the pages (logical pages) 0 to 63 corresponding to the physical blocks is the parity channel, using the block management table.

The command list generation module 234 generates a list (that is, a command list) of write commands each specifying that the corresponding logical page is to be written using 15 channels, that is, all channels excluding the determined parity channel (that is, the parity channel with the parity channel number determined by the parity channel determination module 233) in parallel (block 205). The command list generation module 234 passes the generated command list to the command list issue module 235.

Each of the write commands in the command list generated by the command list generation module 234 contains a physical address specifying a cluster to be written. To generate the write commands, the command list generation module 33 converts logical addresses specifying clusters to be written, into physical addresses.

FIG. 4 shows an example of formats for a logical address and a physical address which are applied in the embodiment. The logical address comprises the logical block ID of the logical block to which the corresponding cluster belongs, and a page number, a plane number, a channel number, and a cluster number. In the embodiment using the NAND flash memory 11 in the memory system 10, the logical address is also referred to as a logical NAND cluster address. The physical address comprises a physical block ID for identifying the physical block to which the corresponding cluster belongs, and a plane number, a page number, a cluster number, and a sector number. The physical address is also referred to as a physical NAND cluster address. The logical address is converted into the physical address using a well-known logical-to-physical address translation (LPT) table. The LPT table is held and managed by a table manager (not shown in the drawings).

Upon receiving a command list generated by the command list generation module 234, the command list issue module 235 simultaneously issues the write commands in the command list to the NAND interface 21. The write commands issued to the NAND interface 21 are stored in a command queue (not shown in the drawings) in the NAND interface 21.

The NAND interface 21 retrieves the write commands corresponding to one logical page (15 channels, that is, all channels excluding the parity channel), from the command queue. The NAND interface 21 generates inter-channel parity data to be written to the parity channel, based on the write data for the channels indicated by the retrieved write commands. Based on the retrieved write commands and the generated inter-channel parity data, the NAND interface 21 writes the write data and the inter-channel parity data to the NAND flash memory 11 using the 16 channels in parallel.

When the command list issue module 235 issues the write commands corresponding to one logical page, to the NAND interface (block 206), the parallel-write detector 231 carries out block 201 again. Thus, blocks 201 to 206 are repeatedly carried out on all the pages 0 to 63 in one logical block to write all the pages 0 to 63 to the NAND flash memory 11. In the write of the pages 0 to 63, for all the channels, the parity channel is allocated to the pages starting with the page 0 based on the round robin algorithm. Thus, as shown in FIG. 3, the parity channel is allocated to a uniform number of pages included in the pages 0 to 63 in the logical block without a variation in the number of pages among the channels.

Hence, the embodiment can improve the parallelism of data reads (for example, data reads for compaction or patrol refreshing) from a logical block in which the parity channel is allocated to a uniform number of pages. This also improves the read performance of the memory system 10.

It is assumed that an error that remains uncorrected after use of the ECC occurs when the NAND interface 21 reads the data in a logical page from the NAND flash memory 11. In this case, the ICP correction module 210 of the NAND interface 21 corrects the data in the channel containing the error location (that is, the error channel) based on the data in 15 channels, that is, all channels excluding the error channel (namely, 15 channels including the parity channel).

At least one embodiment described above can provide a memory system with multiple channels which allows the parallelism of data reads to be improved even with the application of the error correction channel (parity channel), as well as a method for write control including determination of the error correction channel in the memory system.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
   a memory configured to be accessed via a plurality of channels;
   a memory interface configured to access the memory via the plurality of channels in parallel based on a plurality of access commands;
   an inter-channel error correction module configured to correct data in a channel where an error that remains uncorrected after use of an error correction code occurs, based on data in channels which are included in the plurality of channels, and which exclude the channel where the error has occurred but include an error correction channel, if the error occurs in an access carried out by the memory interface;
   an error correction channel determination module configured to determine, for each of a plurality of logical pages, a channel to be allocated to the logical page as the error correction channel so that each of the plurality of channels is allocated to a uniform number of logical pages as the error correction channel when the plurality of logical pages comprised in a logical block are sequentially written to the memory via the plurality of channels in units of pages;
   a command list generation module configured to generate a list of write commands each specifying that a corresponding logical page is to be written using, in parallel, channels included in the plurality of channels and excluding the error correction channel, based on the determination of the channel to be allocated to the corresponding logical page as the error correction channel; and
   a command list issue module configured to issue the list of the write commands to the memory interface.

2. The memory system of claim 1, further comprising an error correction channel manager configured to manage, for each logical block, an error correction channel determination status indicative of the determination of the channel to be allocated as the error correction channel,
   wherein the error correction channel determination module is configured to determine a channel to be allocated to a next logical page in the logical block as the error correction channel, based on the error correction channel determination status.

3. The memory system of claim 2, wherein:
   the error correction channel manager is configured to manage the error correction channel determination status based on a last channel number, which is a channel number of the channel determined for a write of a last logical page in the logical block; and
   the error correction channel determination module is configured to determine the channel to be allocated to the next logical page as the error correction channel, based on the last channel number.

4. The memory system of claim 3, wherein the error correction channel determination module determines one of the plurality of channels which has a channel number following the last channel number to be allocated to the next logical page as the error correction channel, based on a round robin algorithm.

5. The memory system of claim 2, wherein the error correction channel determination module is configured to randomly determine the channel to be allocated to the next logical page in the logical block as the error correction channel, based on the error correction channel determination status.

6. A method for controlling writing in a memory system comprising a memory configured to be accessed via a plurality of channels, a memory interface configured to access the memory via the plurality of channels in parallel based on a plurality of access commands, and an inter-channel error correction module configured to correct data in a channel where an error that remains uncorrected after use of an error correction code occurs, based on data in channels which are included in the plurality of channels, and which exclude the channel where the error has occurred but include an error correction channel, if the error occurs in an access carried out by the memory interface, wherein the method comprises:

determining, for each of a plurality of logical pages, a channel to be allocated to the logical page as the error correction channel so that each of the plurality of channels is allocated to a uniform number of logical pages as the error correction channel when the plurality of logical pages comprised in a logical block are sequentially written to the memory via the plurality of channels in units of pages;

generating a list of write commands each specifying that a corresponding logical page is to be written using, in parallel, channels included in the plurality of channels and excluding the error correction channel, based on the determination of the channel to be allocated to the corresponding logical page as the error correction channel; and issuing the list of the write commands to the memory interface.

7. The method of claim 6, further comprising managing, for each logical block, an error correction channel determination status indicative of the determination of the channel to be allocated as the error correction channel, wherein the determining comprises determining a channel to be allocated to a next logical page in the logical block as the error correction channel, based on the error correction channel determination status.

8. The method of claim 7, wherein:

the error correction channel determination status is managed based on a last channel number, which is a channel number of the channel determined for a write of a last logical page in the logical block; and the channel to be allocated to the next logical page as the error correction channel is determined based on the last channel number.

9. The method of claim 8, wherein one of the plurality of channels which has a channel number following the last channel number is determined to be allocated to the next logical page as the error correction channel, based on a round robin algorithm.

10. The method of claim 7, wherein the channel to be allocated to the next logical page in the logical block as the error correction channel is randomly determined based on the error correction channel determination status.

\* \* \* \* \*